United States Patent
Nakatani

(10) Patent No.: US 9,447,716 B2
(45) Date of Patent: Sep. 20, 2016

(54) HONEYCOMB STRUCTURE

(71) Applicant: NGK INSULATORS, LTD., Nagoya (JP)

(72) Inventor: Takahiko Nakatani, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 127 days.

(21) Appl. No.: 13/849,728

(22) Filed: Mar. 25, 2013

(65) Prior Publication Data

US 2014/0127455 A1    May 8, 2014

Related U.S. Application Data

(60) Provisional application No. 61/617,750, filed on Mar. 30, 2012.

(51) Int. Cl.
  *F01N 3/022* (2006.01)
  *B01D 46/24* (2006.01)
  *F01N 3/28* (2006.01)
  *C04B 38/00* (2006.01)

(52) U.S. Cl.
  CPC ........... *F01N 3/2828* (2013.01); *B01D 46/247* (2013.01); *B01D 46/2429* (2013.01); *B01D 46/2459* (2013.01); *B01D 46/2474* (2013.01); *C04B 38/0006* (2013.01); B01D 2046/2433 (2013.01); B01D 2046/2437 (2013.01); B01D 2279/30 (2013.01); F01N 2330/34 (2013.01); F01N 2330/60 (2013.01); Y10T 428/24165 (2015.01)

(58) Field of Classification Search
None
See application file for complete search history.

(56) References Cited

U.S. PATENT DOCUMENTS

| | | | |
|---|---|---|---|
| 5,514,446 A * | 5/1996 | Machida et al. | 428/116 |
| 2002/0192426 A1 | 12/2002 | Ichikawa et al. | |
| 2003/0024219 A1 * | 2/2003 | Harada | F01N 3/0222 55/523 |
| 2004/0071932 A1 * | 4/2004 | Ishihara et al. | 428/116 |
| 2005/0069469 A1 * | 3/2005 | Fu et al. | 422/180 |
| 2010/0247852 A1 * | 9/2010 | Yamada et al. | 428/116 |
| 2011/0236624 A1 * | 9/2011 | Saito et al. | 428/116 |
| 2012/0183725 A1 | 7/2012 | Noguchi et al. | |
| 2014/0272279 A1 * | 9/2014 | Aoyama | 428/118 |

FOREIGN PATENT DOCUMENTS

| | | | |
|---|---|---|---|
| EP | 2 236 205 A2 | 10/2010 | |
| EP | 2 484 446 A1 | 8/2012 | |
| GB | 2071640 A * | 9/1981 | |

(Continued)

OTHER PUBLICATIONS

Partial European Search Report (Application No. 13160978.6) dated Jul. 8, 2016.

*Primary Examiner* — David Sample
*Assistant Examiner* — Nicholas W Jordan
(74) *Attorney, Agent, or Firm* — Burr & Brown, PLLC

(57) ABSTRACT

A honeycomb structure includes a honeycomb structure part having porous partition walls which form a plurality of cells having a hexagonal cross-sectional shape and extending through the honeycomb structure part from an inflow end surface to an outflow end surface to become through channels of a fluid, and having an outer peripheral wall which is positioned at an outermost periphery. A porosity of the partition walls is from 35 to 60%, an average pore diameter of the partition walls is from 1 to 5 μm, and among the cells, incomplete cells which are the cells formed by the partition walls and the outer peripheral wall are plugged from the inflow end surface to the outflow end surface.

14 Claims, 3 Drawing Sheets

(56) References Cited

FOREIGN PATENT DOCUMENTS

| | | |
|---|---|---|
| JP | S63-012658 B | 3/1988 |
| JP | H11-270334 | 10/1999 |
| JP | 2004-154768 A | 6/2004 |
| JP | 2009-242133 A1 | 10/2009 |
| JP | 2010-234316 A | 10/2010 |
| JP | 2011-230005 A | 11/2011 |
| WO | 2011/037247 A1 | 3/2011 |

* cited by examiner

HONEYCOMB STRUCTURE

CROSS-REFERENCE TO RELATED APPLICATION

The present application is an application based on U.S. 61/617,750 filed on Mar. 30, 2012 with the United States Patent and Trademark Office, the entire contents of which are incorporated herein by reference.

BACKGROUND OF THE INVENTION

1. Field of the Invention

The present invention relates to a honeycomb structure, and more particularly, it relates to a honeycomb structure as a catalyst support of a catalyst body in which a time until a catalyst becomes active is short and a purification efficiency is enhanced.

2. Description of Related Art

Heretofore, an exhaust gas purifying device has been suggested in which a catalyst for purification is loaded onto a catalyst support to purify components to be purified which are included in exhaust gases discharged from stationary engines for a car, a construction machine and an industrial purpose, a combustion apparatus, and the like. Examples of the components to be purified include hydrocarbons (HC), carbon monoxide (CO) and nitrogen oxides ($NO_x$). As the catalyst support for such an exhaust gas purifying device, there is used, for example, a honeycomb structure (the honeycomb catalyst support) including porous partition walls with which a plurality of cells are formed to become through channels of a fluid (e.g., see Patent Document 1). The catalyst for purification is loaded onto the surfaces of the partition walls of the honeycomb catalyst support and inner porous surfaces of micropores (hereinafter referred to also as "the pores").

For the purification of HC, CO and $NO_x$ included in the exhaust gas, the purification by a ternary catalyst is effective, and such a ternary catalyst is broadly used in purifying the exhaust gas. A certain degree of high temperature is required so that the ternary catalyst or the like effectively acts. Consequently, how to rapidly raise the temperature of the catalyst loaded onto the honeycomb catalyst support is considered to be important in purifying the exhaust gas. At an initial stage of an operation, for example, at the start of an engine, the ternary catalyst loaded onto the honeycomb catalyst support does not sufficiently perform the purification of HC and CO in the exhaust gas, and is discharged to the outside sometimes, before the ternary catalyst is warmed up to a temperature at which the ternary catalyst effectively acts.

To solve such a problem, heretofore, a countermeasure has been employed to decrease a thickness of each of the partition walls of the honeycomb catalyst support or increase a porosity of the honeycomb catalyst support, thereby decreasing a heat capacity of the honeycomb catalyst support. Consequently, the honeycomb catalyst support is warmed at an early stage by the exhaust gas discharged from a vehicle engine (i.e., the combustion gas), so that the temperature of the catalyst loaded onto the honeycomb catalyst support can be raised earlier. Therefore, also at the initial stage of the operation of the engine, a high purifying function can be obtained.

[Patent Document 1] JP-A-2009-242133

SUMMARY OF THE INVENTION

In a honeycomb structure disclosed in Patent Document 1, there has been room for improvement to shorten a time until a catalyst becomes active (the light off time). When the light off time is short, it is meant that "light off properties are suitable". Furthermore, when a heat capacity of a honeycomb catalyst support is decreased to shorten the light off time, warmth retaining properties of the honeycomb catalyst support deteriorate. That is, there has been the problem that a purification efficiency deteriorates.

The present invention has been developed in view of such problems of conventional technologies, and an object thereof is to provide a honeycomb structure as a catalyst support of a catalyst body in which a time until a catalyst becomes active is short and a purification efficiency is enhanced.

According to the present invention, the following honeycomb structures are provided.

[1] A honeycomb structure including a honeycomb structure part having porous partition walls which form a plurality of cells having a hexagonal cross-sectional shape and extending through the honeycomb structure part from an inflow end surface as one end surface to an outflow end surface as the other end surface to become through channels of a fluid, and having an outer peripheral wall which is positioned at an outermost periphery, wherein a porosity of the partition walls is from 35 to 60%, an average pore diameter of the partition walls is from 1 to 5 µm, the partition walls have outer peripheral partition walls which are the partition walls to form the cells corresponding to ten cells from the outer peripheral wall toward the center, and center partition walls which are the partition walls other than the outer peripheral partition walls, a thickness of each of the center partition walls is from 0.064 to 0.114 mm, and a thickness of each of the outer peripheral partition walls is from 0.02 to 0.07 mm larger than the thickness of each of the center partition walls.

[2] A honeycomb structure including a honeycomb structure part having porous partition walls which form a plurality of cells having a hexagonal cross-sectional shape and extending through the honeycomb structure part from an inflow end surface as one end surface to an outflow end surface as the other end surface to become through channels of a fluid, and having an outer peripheral wall which is positioned at an outermost periphery, wherein a porosity of the partition walls is from 35 to 60%, an average pore diameter of the partition walls is from 1 to 5 µm, and among the cells, incomplete cells which are the cells formed by the partition walls and the outer peripheral wall are plugged from the inflow end surface to the outflow end surface.

[3] The honeycomb structure according to the above [2], wherein the incomplete cell and the cell having three or more sides which come in contact with the incomplete cell are plugged from the inflow end surface to the outflow end surface of the honeycomb structure part.

[4] The honeycomb structure according to the above [3], wherein the incomplete cell and the cells adjacent to the incomplete cell are plugged from the inflow end surface to the outflow end surface of the honeycomb structure part.

[5] A honeycomb structure including a honeycomb structure part having porous partition walls which form a plurality of cells having a hexagonal cross-sectional shape and extending through the honeycomb structure part from an inflow end surface as one end surface to an outflow end surface as the other end surface to become through channels of a fluid, and having an outer peripheral wall which is positioned at an outermost periphery, wherein a porosity of the partition walls is from 35 to 60%, an average pore diameter of the partition walls is from 1 to 5 µm, and among the cells, there are plugged the cells which are formed between the outer peripheral surface of the honeycomb structure part and a position at which a distance from the outer peripheral surface corresponds to a length of 2% of a diameter of the honeycomb structure part.

[6] The honeycomb structure according to any one of the above [2] to [5], wherein the partition walls have outer peripheral partition walls which are the partition walls to form the cells corresponding to ten cells from the outer peripheral wall toward the center, and center partition walls which are the partition walls other than the outer peripheral partition walls, a thickness of each of the center partition walls is from 0.064 to 0.114 mm, and a thickness of each of the outer peripheral partition walls is from 0.02 to 0.07 mm larger than the thickness of each of the center partition walls.

In a honeycomb structure (the first honeycomb structure) of the present invention, a porosity of partition walls is from 35 to 60%, and an average pore diameter of the partition walls is from 1 to 5 µm. That is, a heat capacity of the partition walls of the honeycomb structure of the present invention is smaller than a heat capacity of a conventional honeycomb structure. Therefore, the honeycomb structure of the present invention is warmed at an early stage by an exhaust gas. Consequently, in a honeycomb catalyst body in which the honeycomb structure of the present invention is used as a catalyst support, a time until a catalyst becomes active shortens. Moreover, the honeycomb structure of the present invention has outer peripheral partition walls which are the partition walls to form the cells corresponding to ten cells from the outer peripheral wall toward the center, and center partition walls which are the partition walls other than the outer peripheral partition walls. Moreover, a thickness of each of the center partition walls is from 0.064 to 0.114 mm, and a thickness of each of the outer peripheral partition walls is from 0.02 to 0.07 mm larger than the thickness of each of the center partition walls. Therefore, a heat capacity of a region where the outer peripheral partition walls are formed is larger than that of a region where the center partition walls are formed. As a result, once the honeycomb structure is heated up to a predetermined temperature, the temperature is retained. That is, in the honeycomb catalyst body in which the honeycomb structure of the present invention is used as the catalyst support, an active temperature of the catalyst is maintained. Therefore, in the above honeycomb catalyst body, a purification efficiency is enhanced. Furthermore, in the honeycomb structure of the present invention, a strength is enhanced.

In a honeycomb structure (the second honeycomb structure) of the present invention, a porosity of partition walls is from 35 to 60%, and an average pore diameter of the partition walls is from 1 to 5 µm. That is, a heat capacity of the partition walls of the honeycomb structure of the present invention is smaller than a heat capacity of a conventional honeycomb structure. Therefore, the honeycomb structure of the present invention is warmed at an early stage by an exhaust gas. Consequently, in a honeycomb catalyst body in which the honeycomb structure of the present invention is used as a catalyst support, a time until a catalyst becomes active shortens. Moreover, in the honeycomb structure of the present invention, among cells, incomplete cells which are the cells formed by the partition walls and an Outer peripheral wall are plugged from an inflow end surface to an outflow end surface. Therefore, a heat capacity of an outer peripheral portion provided with the plugged cells is larger than that of a center portion other than the outer peripheral portion. As a result, once the honeycomb structure is heated up to a predetermined temperature, the temperature is retained. That is, in the honeycomb catalyst body in which the honeycomb structure of the present invention is used as the catalyst support, an active temperature of the catalyst is maintained. Therefore, in the above honeycomb catalyst body, a purification efficiency is enhanced. Furthermore, in the honeycomb structure of the present invention, a strength is enhanced.

In a honeycomb structure (the third honeycomb structure) of the present invention, a porosity of partition walls is from 35 to 60%, and an average pore diameter of the partition walls is from 1 to 5 µm. That is, a heat capacity of the partition walls of the honeycomb structure of the present invention is smaller than a heat capacity of a conventional honeycomb structure. Therefore, the honeycomb structure of the present invention is warmed at an early stage by an exhaust gas. Consequently, in a honeycomb catalyst body in which the honeycomb structure of the present invention is used as a catalyst support, a time until a catalyst becomes active shortens. Moreover, in the honeycomb structure of the present invention, "among cells," there are plugged "the cells which are formed between the outer peripheral surface of a honeycomb structure part and a position at which a distance from the outer peripheral surface corresponds to a length of 2% of a diameter of the honeycomb structure part". Therefore, a heat capacity of an outer peripheral portion provided with the plugged cells is larger than that of a center portion other than the outer peripheral portion. As a result, once the honeycomb structure is heated up to a predetermined temperature, the temperature is retained. That is, in the honeycomb catalyst body in which the honeycomb structure of the present invention is used as the catalyst support, an active temperature of the catalyst is maintained. Therefore, in the above honeycomb catalyst body, a purification efficiency is enhanced. Furthermore, in the honeycomb structure of the present invention, a strength is enhanced.

DETAILED DESCRIPTION OF THE INVENTION

Hereinafter, embodiments of the present invention will be described. It should be understood that the present invention is not limited to the following embodiments and that modifications, improvements and the like suitably added to the following embodiments based on the ordinary knowledge of a person skilled in the art without departing from the scope of the present invention also fall in the scope of the present invention.

Figure 5:
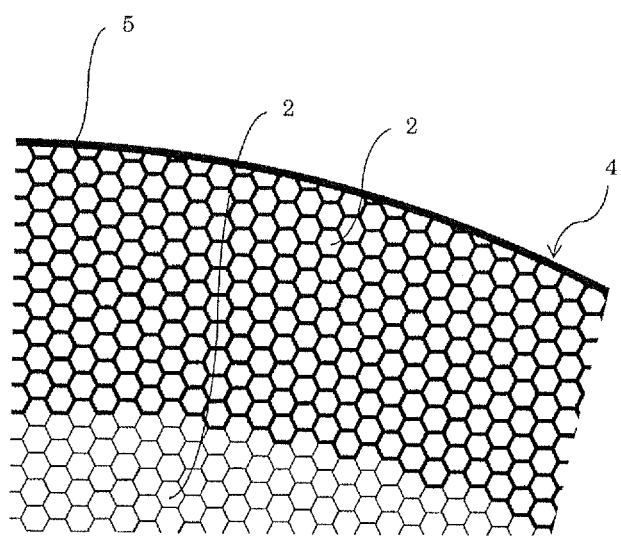
FIG. 5 is an enlarged view schematically showing a partial enlarged portion of an inflow end surface of another embodiment of the honeycomb structure of the present invention.

[1] Honeycomb Structure (First Honeycomb Structure):

One embodiment of a honeycomb structure of the present invention is, for example, the following honeycomb structure. That is, the honeycomb structure of the present embodiment includes a honeycomb structure part having porous partition walls and an outer peripheral wall which is positioned at an outermost periphery. The partition walls form a plurality of cells having a hexagonal cross-sectional shape and extending through the honeycomb structure part from an inflow end surface as one end surface to an outflow end surface as the other end surface to become through channels of a fluid. A porosity of the partition walls is from 35 to 60%. An average pore diameter of the partition walls is from 1 to 5 µm. The partition walls of the honeycomb structure of the present embodiment have outer peripheral partition walls which are the partition walls to form the cells corresponding to ten cells from the outer peripheral wall toward the center, and center partition walls which are the partition walls other than the outer peripheral partition walls, as shown in FIG. 5. Moreover, a thickness of each of the center partition walls is from 0.064 to 0.114 mm, and a thickness of each of the outer peripheral partition walls is from 0.02 to 0.07 mm larger than the thickness of each of the center partition walls.

In such a honeycomb structure, the porosity of the partition walls is from 35 to 60%, and the average pore diameter of the partition walls is from 1 to 5 µm. That is, a heat capacity of the partition walls of the honeycomb structure of the present embodiment is small. Therefore, the honeycomb structure of the present embodiment is warmed at an early stage by an exhaust gas. Consequently, in a honeycomb catalyst body in which the honeycomb structure of the present embodiment is used as a catalyst support, a time until a catalyst becomes active shortens. Moreover, the honeycomb structure of the present embodiment has the outer peripheral partition walls which are the partition walls to form the cells corresponding to ten cells from the outer peripheral wall toward the center, and the center partition walls which are the partition walls other than the outer peripheral partition walls. Moreover, the thickness of each of the center partition walls is from 0.064 to 0.114 mm, and the thickness of each of the outer peripheral partition walls is from 0.02 to 0.07 mm larger than the thickness of each of the center partition walls. Therefore, a heat capacity of a region where the outer peripheral partition walls are formed is larger than that of a region where the center partition walls are formed. As a result, once the honeycomb structure shown in FIG. 5 is heated up to a predetermined temperature, the temperature is retained. That is, in the honeycomb catalyst body in which the honeycomb structure of the present embodiment is used as the catalyst support, an active temperature of the catalyst is maintained. Therefore, in the above honeycomb catalyst body, a purification efficiency is enhanced. Furthermore, in the honeycomb structure of the present embodiment, a strength is enhanced.

The porosity of the partition walls is from 35 to 60% as described above, and is further preferably from 40 to 55%. When the porosity of the partition walls is in the above range, temperature rise properties of the honeycomb structure enhance. Therefore, in the honeycomb catalyst body in which the honeycomb structure of the present embodiment is used, a purifying performance enhances. When the porosity of the partition walls is smaller than the lower limit value, a mass of the honeycomb structure increases. Therefore, light off properties are not sufficiently obtained, and the purifying performance might deteriorate. On the other hand, when the porosity is in excess of the upper limit value, the strength of the honeycomb structure deteriorates. Therefore, at canning or during use, the honeycomb structure might be damaged. In the present description, "the porosity" is a value measured by a mercury porosimeter.

The average pore diameter of the partition walls is from 1 to 5 µm as described above, and is further preferably from 1 to 3 µm. When the partition walls satisfy the above porosity and the average pore diameter of the partition walls is in the above range, the strength of the honeycomb structure enhances. Moreover, a value of a ratio of the strength of the partition walls to Young's modulus of the partition walls increases, and hence a resistance to heat shock of the honeycomb structure enhances. When the average pore diameter of the partition walls is smaller than the lower limit value, the catalyst is not easily loaded, and hence during the use, the catalyst might peel off. On the other hand, when the average pore diameter is in excess of the upper limit value, the strength of the honeycomb structure deteriorates, and hence at the canning or during the use, the honeycomb structure might be damaged. In the present description, "the average pore diameter" is a value measured by the mercury porosimeter.

As described above, the partition walls of the honeycomb structure of the present embodiment have the outer peripheral partition walls which are the partition walls to form the cells corresponding to ten cells from the outer peripheral wall toward the center, and the center partition walls which are the partition walls other than the outer peripheral partition walls. "The cells corresponding to the ten cells from the outer peripheral wall toward the center" are the ten cells counted from "one of the incomplete cells which are the cells formed by the partition walls and the outer peripheral wall". Moreover, the ten cells counted from the above "incomplete cell" are the cells arranged adjacent to one another in a row via the partition walls. "The center" is a center portion in a cross section perpendicular to a cell extending direction of the honeycomb structure.

The thickness of each of the center partition walls is from 0.064 to 0.114 mm, and further preferably from 0.076 to 0.102 mm. When the thickness of the center partition wall is in the above range, the strength of the honeycomb structure enhances, and hence the resistance to heat shock enhances. When the thickness of the center partition wall is smaller than the lower limit value, the strength of the honeycomb structure deteriorates, and hence at the canning or during the use, the honeycomb structure might be damaged. On the other hand, when the thickness is in excess of the upper limit value, a pressure loss increases. Therefore, when the honeycomb structure is mounted on a car or the like, a fuel efficiency of the car or the like might deteriorate. Additionally, the thickness of each of the center partition walls and the thickness of each of the outer peripheral partition walls are values measured by observing a cross section parallel to a central axis with a microscope.

The thickness of each of the outer peripheral partition walls is from 0.02 to 0.07 mm larger than the thickness of each of the center partition walls, and further preferably from 0.04 to 0.07 mm larger than the thickness of the center partition wall. When the thickness of the outer peripheral partition wall is in the above range, the strength of the honeycomb structure enhances. Furthermore, a heat capacity of the outer peripheral partition walls is larger than that of the center partition walls. Therefore, once the honeycomb structure is heated up to the predetermined temperature, the temperature is retained. That is, in the honeycomb catalyst body in which the honeycomb structure of the present embodiment is used as the catalyst support, the active temperature of the catalyst is maintained. Therefore, the purification efficiency of the above honeycomb catalyst body can be enhanced.

Specifically, the thickness of each of the outer peripheral partition walls is preferably from 0.084 to 0.184 mm, and further preferably from 0.116 to 0.172 mm.

Additionally, the outer peripheral partition walls preferably gradually thicken from the center toward the outer peripheral wall of the honeycomb structure part. When the outer peripheral partition walls gradually thicken from the center toward the outer peripheral wall of the honeycomb structure part in this way, "the thickness of each of the outer peripheral partition walls" is an average thickness of the ten cells counted from the outer peripheral wall.

The cells formed in the honeycomb structure part have a hexagonal cross-sectional shape. In other words, the cell shape of the honeycomb structure part is a hexagonal shape in the cross section perpendicular to the cell extending direction.

A cell density of the honeycomb structure part is preferably from 62 to 140 cells/cm$^2$, and further preferably from 93 to 116 cells/cm$^2$. When the cell density of the honeycomb structure part satisfies the above range, a balance between the purifying performance and the pressure loss is suitable. That is, the honeycomb structure part has a suitable purifying performance, and the pressure loss of the honeycomb structure part is small. When the cell density of the honeycomb structure part is smaller than the lower limit value, an area onto which the catalyst can be loaded decreases, and hence the purifying performance might deteriorate. On the other hand, when the cell density is in excess of the upper limit value, an open frontal area dimension of a cell decreases, and hence the pressure loss might increase.

A thickness of the outer peripheral wall of the honeycomb structure part is preferably from 0.3 to 1.3 mm, and further preferably from 0.8 to 1.3 mm. When the thickness of the outer peripheral wall is in the above range, the strength of the honeycomb structure enhances. Moreover, a heat capacity of the outer peripheral portion of the honeycomb structure increases. Therefore, warmth retaining properties enhance, and hence the purifying performance enhances. When the thickness of the outer peripheral wall is smaller than the lower limit value, the strength of the honeycomb structure deteriorates. Therefore, at the canning, the honeycomb structure might be damaged. On the other hand, when the thickness is in excess of the upper limit value, an area ratio of the outer peripheral wall relatively increases in the cross section perpendicular to the cell extending direction (i.e., a ratio of an area of a portion occupied by the partition walls decreases). Therefore, the pressure loss might increase.

A porosity of the outer peripheral wall is preferably from 35 to 60%, and further preferably from 40 to 55%. When the porosity of the outer peripheral wall is in the above range, temperature rise properties of the outer peripheral wall enhance, thereby enhancing the purifying performance of the honeycomb structure. When the porosity of the outer peripheral wall is smaller than the lower limit value, a heat capacity of the outer peripheral wall increases. Therefore, the temperature rise properties deteriorate, and hence the purifying performance might deteriorate. On the other hand, when the porosity is in excess of the upper limit value, the strength of the outer peripheral wall deteriorates. Therefore, at the canning, the honeycomb structure might be damaged.

An average pore diameter of the outer peripheral wall is preferably from 1 to 5 μm, and further preferably from 1 to 3 μm. When the outer peripheral wall satisfies the above porosity and the average pore diameter of the outer peripheral wall is in the above range, the strength of the honeycomb structure enhances. Moreover, a value of a ratio of the strength of the outer peripheral wall to Young's modulus of the outer peripheral wall increases, and hence the resistance to heat shock of the honeycomb structure enhances. When the average pore diameter of the outer peripheral wall is smaller than the lower limit value, the catalyst is not easily loaded, and hence during the use, the catalyst might peel off. On the other hand, when the average pore diameter is in excess of the upper limit value, the strength of the outer peripheral wall deteriorates, and hence at the canning or during the use, the honeycomb structure might be damaged.

An outer shape of the honeycomb structure part (i.e., the honeycomb structure) is preferably, for example, a circular cylindrical shape, an elliptic cylindrical shape, a quadrangular cylindrical shape, a pentangular cylindrical shape, or a hexagonal cylindrical shape, and especially preferably the circular cylindrical shape. As a size of the honeycomb structure part, for example, a length of the honeycomb structure part in the cell extending direction is preferably from 50 to 200 mm. Moreover, when the outer shape of the honeycomb structure part is the circular cylindrical shape, a diameter can be from 50 to 200 mm.

The partition walls and the outer peripheral wall of the honeycomb structure part preferably contain a ceramic material as a main component. A material of the partition walls and the outer peripheral wall is preferably at least one selected from, for example, the following group. That is, the material is preferably at least one selected from the group consisting of silicon carbide, a silicon-silicon carbide composite material, cordierite, mullite, alumina, spinel, a silicon carbide-cordierite composite material, lithium aluminum silicate, and aluminum titanate. Among these materials, cordierite is preferable. When the material is cordierite, it is possible to obtain the honeycomb structure having a small coefficient of thermal expansion and an excellent resistance to heat shock. The material of the partition walls is preferably the same as that of the outer peripheral wall. Additionally, the material of the partition walls may be different from that of the outer peripheral wall. When the material "contains the ceramic material as the main component", it is meant that 90 mass % or more of the ceramic material is contained in the whole material.

Additionally, in the honeycomb structure of the present invention, the predetermined cells may be plugged in the same manner as in a honeycomb structure described later (e.g., a honeycomb structure 100).

[2] Manufacturing Method of Honeycomb Structure:

Next, there will be described a manufacturing method of a honeycomb structure which is another embodiment of the honeycomb structure of the present invention.

First, a forming raw material containing a ceramic raw material is kneaded to obtain a kneaded material. The forming raw material is preferably obtained by adding a dispersion medium and an additive to the ceramic raw material. Examples of the additive include an organic binder, a pore former, and a surfactant. An example of the dispersion medium is water.

The ceramic raw material is preferably at least one selected from the group consisting of silicon carbide, a silicon-silicon carbide composite material, a cordierite forming raw material, mullite, alumina, spinel, a silicon carbide-cordierite composite material, lithium aluminum silicate, and aluminum titanate. Among these materials, the cordierite forming raw material is preferable, because the material has a small coefficient of thermal expansion and an excellent resistance to heat shock.

Examples of the organic binder include methylcellulose, hydroxypropoxyl cellulose, hydroxyethyl cellulose, carboxymethylcellulose, and polyvinyl alcohol. Among these binders, methylcellulose and hydroxypropoxyl cellulose are preferably used together. A content of the organic binder is preferably from 0.2 to 2 parts by mass to 100 parts by mass of the ceramic raw material.

There is not any special restriction on the pore former, as long as the pore former is fired to form pores. Examples of the pore former include starch, foamed resin, a water-absorbing resin, and silica gel. A content of the pore former is preferably from 5 to 15 parts by mass to 100 parts by mass of the ceramic raw material.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2 parts by mass to 100 parts by mass of the ceramic raw material.

A content of the dispersion medium is preferably from 10 to 30 parts by mass to 100 parts by mass of the ceramic raw material.

A porous base material having desirable porosity and average pore diameter can be obtained by regulating particle diameters and a blend amount of the ceramic raw material (aggregate particles) for use, and particle diameters and a blend amount of the pore former to be added.

There is not any special restriction on a method of kneading the forming raw material to form the kneaded material. An example of the method is a method using a kneader, a vacuum clay kneader or the like.

Next, the kneaded material is extruded into a honeycomb shape to prepare a formed honeycomb body. The extrusion forming can be performed by using such a die that it is possible to obtain cells having a hexagonal cross-sectional shape and partition walls satisfying a predetermined thickness. As a material of the die, a hard metal which does not easily wear down is preferable. The formed honeycomb body is a structure including partition walls which form a plurality of cells having a hexagonal cross-sectional shape and extending through the formed honeycomb body from one end surface to the other end surface to become through channels of a fluid, and including an outer peripheral wall which is positioned at an outermost periphery.

Next, the formed honeycomb body is fired to obtain the fired honeycomb body. A firing temperature can suitably be determined in accordance with a material of the formed honeycomb body. When the material of the formed honeycomb body is, for example, cordierite, the firing temperature is preferably from 1380 to 1450° C., and further preferably from 1400 to 1440° C. Moreover, a firing time is preferably from about three to ten hours.

The formed honeycomb body may be dried before fired. There is not any special restriction on a drying method. Examples of the drying method include hot air drying, microwave drying, dielectric drying, reduced-pressure drying, vacuum drying, and freeze-drying. Among these methods, the dielectric drying, the microwave drying or the hot air drying is preferably performed alone, or a combination of the methods is preferably performed. Moreover, as drying conditions, a drying temperature of 30 to 150° C. and a drying time of one minute to two hours are preferable.

Figure 1:
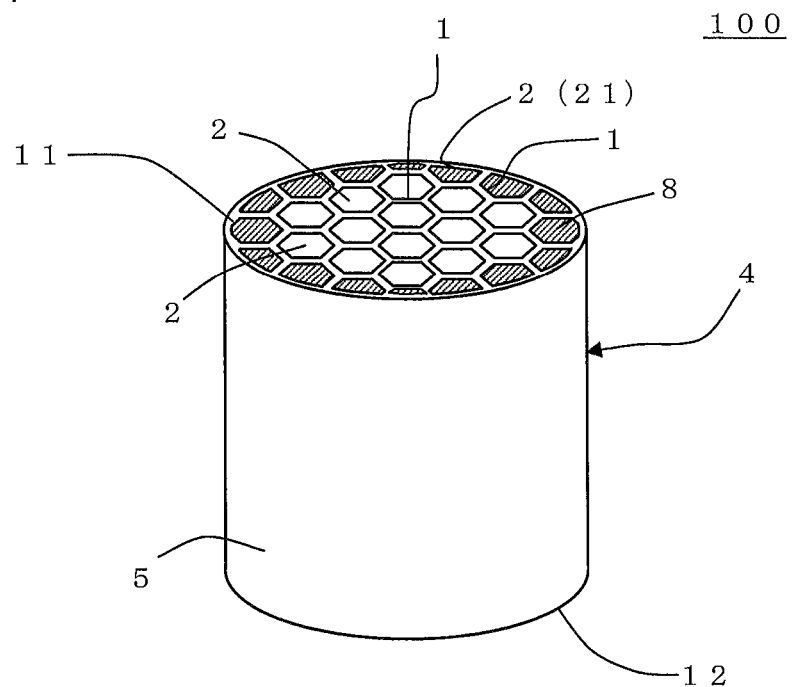
FIG. 1 is a perspective view schematically showing another embodiment of a honeycomb structure of the present invention.
Figure 2:
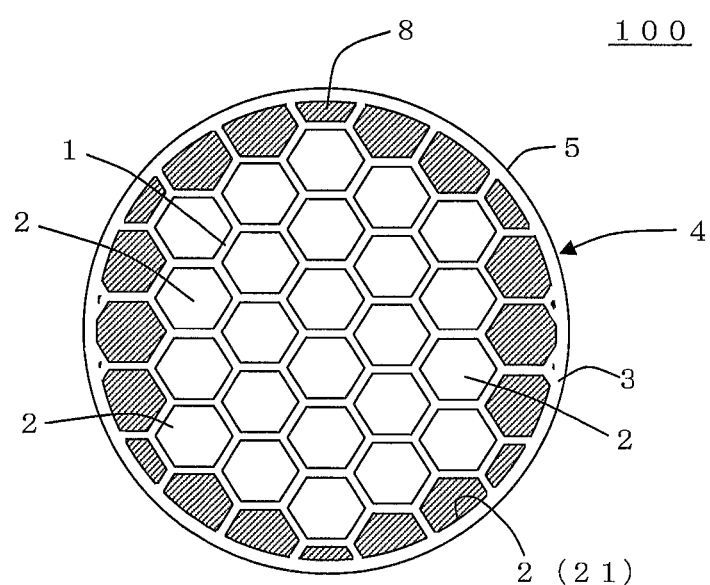
FIG. 2 is a plan view schematically showing an inflow end surface of the other embodiment of the honeycomb structure of the present invention.

[3] Honeycomb Structure (Second Honeycomb Structure):

Another embodiment of the honeycomb structure of the present invention is, for example, a honeycomb structure 100 shown in FIG. 1 and FIG. 2. As shown in FIG. 1 and FIG. 2, the honeycomb structure 100 includes a honeycomb structure part 4 having porous partition walls 1 and an outer peripheral wall 5 which is positioned at an outermost periphery. The partition walls 1 form a plurality of cells 2 having a hexagonal cross-sectional shape and extending through the honeycomb structure part from an inflow end surface 11 as one end surface to an outflow end surface 12 as the other end surface to become through channels of a fluid. A porosity of the partition walls 1 is from 35 to 60%. An average pore diameter of the partition walls 1 is from 1 to 5 µm. In the honeycomb structure 100, among the cells 2, incomplete cells 21 which are the cells 2 formed by the partition walls 1 and the outer peripheral wall 5 are plugged from the inflow end surface 11 to the outflow end surface 12. FIG. 1 is a perspective view schematically showing the other embodiment of the honeycomb structure of the present invention. FIG. 2 is a plan view schematically showing the inflow end surface of the other embodiment of the honeycomb structure of the present invention.

In the honeycomb structure 100, the porosity of the partition walls 1 is from 35 to 60%, and the average pore diameter of the partition walls 1 is from 1 to 5 µm. That is, a heat capacity of the partition walls 1 of the honeycomb structure 100 is smaller than a heat capacity of a conventional honeycomb structure. Therefore, the honeycomb structure 100 is warmed at an early stage by an exhaust gas. Consequently, in a honeycomb catalyst body in which the honeycomb structure 100 is used as a catalyst support, a time until a catalyst becomes active shortens. Moreover, in the honeycomb structure 100, among the cells 2, the incomplete cells 21 which are the cells 2 formed by the partition walls 1 and the outer peripheral wall 5 are plugged from the inflow end surface 11 to the outflow end surface 12. Therefore, a heat capacity of an outer peripheral portion provided with the plugged cells 2 is larger than that of a center portion other than the outer peripheral portion. As a result, once the honeycomb structure is heated up to a predetermined temperature, the temperature is retained. That is, in the honeycomb catalyst body in which the honeycomb structure 100 is used as the catalyst support, an active temperature of the catalyst is maintained. Therefore, in the above honeycomb catalyst body, a purification efficiency is enhanced. Furthermore, in the honeycomb structure 100 of the present embodiment, a strength is enhanced.

In the honeycomb structure of the present invention, the partition walls may have outer peripheral partition walls, and center partition walls which are the partition walls other than the outer peripheral partition walls. A thickness of each of the center partition walls may be from 0.064 to 0.114 mm, and a thickness of each of the outer peripheral partition walls may be from 0.02 to 0.07 mm larger than the thickness of each of the center partition walls. The outer peripheral partition walls are the partition walls to form the cells corresponding to ten cells from the outer peripheral wall toward the center. When the partition walls satisfy the above conditions, in the honeycomb catalyst body in which the honeycomb structure of the present invention is used as the catalyst support, the active temperature of the catalyst is further suitably maintained. Therefore, a purification efficiency is further enhanced. Furthermore, in the honeycomb structure of the present invention, the strength is further enhanced.

Similarly to the above-mentioned "honeycomb structure of the one embodiment", the porosity of the partition walls is from 35 to 60%, and further preferably from 40 to 55%. When the porosity of the partition walls is in the above range, temperature rise properties of the honeycomb structure enhance. Therefore, in the honeycomb catalyst body in which the honeycomb structure of the present embodiment is used, there is the advantage that a purifying performance enhances. When the porosity of the partition walls is smaller than the lower limit value, a mass of the honeycomb structure increases. Therefore, light off properties are not sufficiently obtained, and the purifying performance might deteriorate. On the other hand, when the porosity is in excess of the upper limit value, the strength of the honeycomb structure deteriorates. Therefore, at canning or during use, the honeycomb structure might be damaged.

Similarly to the above-mentioned "honeycomb structure of the one embodiment", the average pore diameter of the partition walls is from 1 to 5 µm, and further preferably from 1 to 3 µm. When the partition walls satisfy the above porosity and the average pore diameter of the partition walls is in the above range, the strength of the honeycomb structure enhances. Moreover, a value of a ratio of the strength of the partition walls to Young's modulus of the partition walls increases, and hence a resistance to heat shock of the honeycomb structure enhances. When the average pore diameter of the partition walls is smaller than the lower limit value, the catalyst is not easily loaded, and hence during the use, the catalyst might peel off. On the other hand, when the average pore diameter is in excess of the upper limit value, the strength of the honeycomb structure deteriorates, and hence at the canning or during the use, the honeycomb structure might be damaged.

Similarly to the above-mentioned "honeycomb structure of the one embodiment", the cells formed in the honeycomb structure part have a hexagonal cross-sectional shape. In other words, the cell shape of the honeycomb structure part is a hexagonal shape in a cross section perpendicular to a cell extending direction. When the cross-sectional shape of the cells is the hexagonal shape in this way, the strength of the honeycomb structure deteriorates as compared with a case where the shape is another polygonal shape. Therefore, since the honeycomb structure has the above outer peripheral partition walls, the strength of the honeycomb structure can suitably be enhanced.

In the honeycomb structure 100, as described above, the incomplete cells 21 are plugged from the inflow end surface 11 to the outflow end surface 12. Since the incomplete cells 21 are plugged from the inflow end surface 11 to the outflow end surface 12, the heat capacity of the outer peripheral portion of the honeycomb structure 100 is larger than that of the center portion other than the outer peripheral portion. As a result, once the honeycomb structure is heated up to the predetermined temperature, the temperature is retained. That is, the active temperature of the catalyst is maintained. When the cells are "plugged from the inflow end surface 11 to the outflow end surface 12 of the honeycomb structure part 4", it is meant that a plugging material is filled into the cells from the inflow end surface 11 to the outflow end surface 12 of the honeycomb structure part 4 to plug the cells.

Plugged portions 8 with which the incomplete cells 21 are plugged may be porous owing to a large number of pores which are formed in the same manner as in the partition walls 1, or may be dense without any pores.

In the case of the porous plugged portions, a porosity of the plugged portions 8 is preferably from 35 to 60%, and further preferably from 40 to 55%. When the porosity of the plugged portions 8 is in the above range, temperature rise properties of the honeycomb structure enhance. Therefore, in the honeycomb catalyst body in which the honeycomb structure of the present embodiment is used, the purifying performance enhances. When the porosity of the plugged portions 8 is smaller than the lower limit value, a mass of the honeycomb structure increases. Therefore, light off properties are not sufficiently obtained, and the purifying performance might deteriorate. On the other hand, when the porosity is in excess of the upper limit value, the strength of the honeycomb structure deteriorates. Therefore, at the canning or during the use, the honeycomb structure might be damaged.

Moreover, when the plugged portions 8 are porous, an average pore diameter of the plugged portions 8 is preferably from 1 to 5 µm, and further preferably from 1 to 3 µm. When the average pore diameter of the plugged portions 8 is in the above range, the strength of the honeycomb structure enhances. Furthermore, the value of the ratio of the strength of the partition walls to the Young's modulus of the partition walls increases, and hence the resistance to heat shock of the honeycomb structure enhances. When the average pore diameter of the plugged portions 8 is smaller than the lower limit value, the catalyst is not easily loaded, and hence during the use, the catalyst might peel off. On the other hand, when the average pore diameter is in excess of the upper limit value, the strength of the honeycomb structure deteriorates, and hence at the canning or during the use, the honeycomb structure might be damaged.

Additionally, either when the plugged portions 8 are porous or when the plugged portions 8 are dense, a material of the plugged portions 8 can be similar to a material of the partition walls 1.

Figure 3:
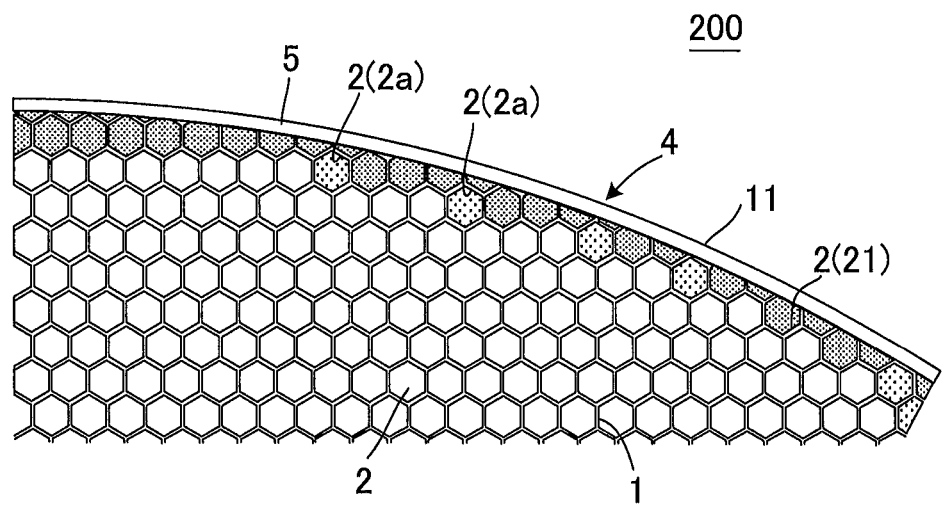
FIG. 3 is an enlarged view schematically showing a partial enlarged portion of an inflow end surface of still another embodiment of the honeycomb structure of the present invention.

FIG. 3 is an enlarged view schematically showing a partial enlarged portion of an inflow end surface of still another embodiment of the honeycomb structure of the present invention. The honeycomb structure of the present invention is preferably a honeycomb structure 200 shown in FIG. 3. That is, in the honeycomb structure 200, an incomplete cell 21 and a cell 2 (2*a*) having three or more sides which come in contact with the incomplete cell 21 are plugged from an inflow end surface 11 to an outflow end surface 12 of a honeycomb structure part 4. In the honeycomb structure 200, a strength enhances, and hence a resistance to heat shock enhances, as compared with a honeycomb structure in which the cell 2 (2*a*) is not plugged. Furthermore, in the honeycomb structure 200, a heat capacity increases, and hence a warmth retaining effect enhances, thereby enhancing a purifying performance.

In other words, "the cell having three or more sides which come in contact with the incomplete cell" indicates that among six cells adjacent to one another via the partition walls, three or more cells are the incomplete cells.

Figure 4:
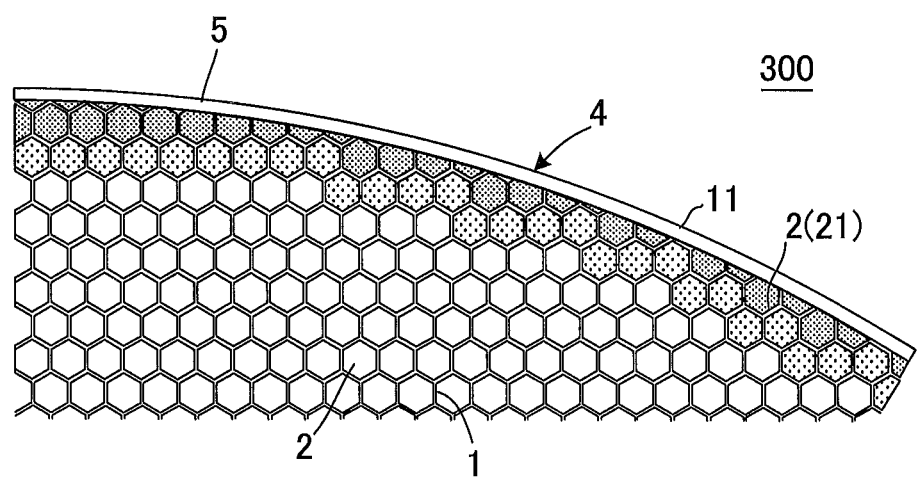
FIG. 4 is an enlarged view schematically showing a partial enlarged portion of an inflow end surface of a further embodiment of the honeycomb structure of the present invention.

FIG. 4 is an enlarged view schematically showing a partial enlarged portion of an inflow end surface of a further embodiment of the honeycomb structure of the present invention. The honeycomb structure of the present invention is preferably a honeycomb structure 300 shown in FIG. 4. That is, in the honeycomb structure 300, an incomplete cell 21 and cells 2 adjacent to the incomplete cell 21 are plugged from an inflow end surface 11 to an outflow end surface 12 of a honeycomb structure part 4. In the honeycomb structure 300, a strength enhances, and hence a resistance to heat shock enhances, as compared with a honeycomb structure in which the cells 2 (2*a*) are not plugged. Furthermore, in the honeycomb structure 300, a heat capacity increases, and hence a warmth retaining effect enhances, thereby enhancing a purifying performance.

A thickness of each of partition walls of the honeycomb structure part is preferably from 0.3 to 1.3 mm, and further preferably from 0.8 to 1.3 mm. When the thickness of the partition wall is in the above range, the strength of the honeycomb structure part enhances, and hence the resistance to heat shock enhances. Furthermore, the heat capacity of the honeycomb structure increases, and hence the warmth retaining effect further enhances. Therefore, the honeycomb structure has an enhanced purifying performance. When the thickness of the partition wall is smaller than the lower limit value, the strength of the honeycomb structure deteriorates, and hence at canning or during use, the honeycomb structure might be damaged. When the thickness is in excess of the upper limit value, a mass of the honeycomb structure increases. Therefore, light off properties are not sufficiently obtained, and the purifying performance might deteriorate. The thickness of the partition wall is a value measured by observing a cross section parallel to a central axis with a microscope.

A cell density, an outer peripheral wall thickness and the like of the honeycomb structure part can be similar to those of the above-mentioned "honeycomb structure of the one embodiment".

[4] Manufacturing Method of Honeycomb Structure:

Next, a manufacturing method of the honeycomb structure of the present invention will be described. Hereinafter, the manufacturing method of the honeycomb structure 100 which is the other embodiment of the honeycomb structure of the present invention will be described.

First, a forming raw material containing a ceramic raw material is kneaded to obtain a kneaded material. The forming raw material is preferably obtained by adding a dispersion medium and an additive to the ceramic raw material. Examples of the additive include an organic binder, a pore former, and a surfactant. An example of the dispersion medium is water.

The ceramic raw material is preferably at least one selected from the group consisting of silicon carbide, a silicon-silicon carbide composite material, a cordierite forming raw material, mullite, alumina, spinel, a silicon carbide-cordierite composite material, lithium aluminum silicate, and aluminum titanate. Among these materials, the cordierite forming raw material is preferable, because the material has a small coefficient of thermal expansion and an excellent resistance to heat shock.

Examples of the organic binder include methylcellulose, hydroxypropoxyl cellulose, hydroxyethyl cellulose, carboxymethylcellulose, and polyvinyl alcohol. Among these binders, methylcellulose and hydroxypropoxyl cellulose are preferably used together. A content of the organic binder is preferably from 0.2 to 2 parts by mass to 100 parts by mass of the ceramic raw material.

There is not any special restriction on the pore former, as long as the pore former is fired to form pores. Examples of the pore former include starch, foamed resin, a water-absorbing resin, and silica gel. A content of the pore former is preferably from 5 to 15 parts by mass to 100 parts by mass of the ceramic raw material.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2 parts by mass to 100 parts by mass of the ceramic raw material.

A content of the dispersion medium is preferably from 10 to 30 parts by mass to 100 parts by mass of the ceramic raw material.

A porous base material having desirable porosity and average pore diameter can be obtained by regulating particle diameters and a blend amount of the ceramic raw material (aggregate particles) for use, and particle diameters and a blend amount of the pore former to be added.

There is not any special restriction on a method of kneading the forming raw material to form the kneaded material. An example of the method is a method using a kneader, a vacuum clay kneader or the like.

Next, the kneaded material is extruded into a honeycomb shape to prepare a formed honeycomb body. The extrusion forming can be performed by using such a die that the hexagonal cell shape, the partition wall thickness and the cell density can be obtained. As a material of the die, a hard metal which does not easily wear down is preferable. The formed honeycomb body is a structure including partition walls which form a plurality of hexagonal cells extending through the formed honeycomb body from one end surface to the other end surface to become through channels of a fluid, and including an outer peripheral wall which is positioned at an outermost periphery.

Next, a plugging material slurry is filled into incomplete cells of the obtained formed honeycomb body. Thus, the incomplete cells of the formed honeycomb body are plugged from the inflow end surface to the outflow end surface.

Additionally, in the present "other embodiment", the plugging material slurry is filled only into the incomplete cells, but the cells into which the plugging material slurry is to be filled can suitably be selected so as to obtain the desirable honeycomb structure of the present invention.

As a method of plugging the incomplete cells, a heretofore known method can suitably be employed. For example, the plugging material slurry can be filled into the incomplete cells of the formed honeycomb body as follows. First, a mask is attached to the one end surface (e.g., the inflow end surface) of the formed honeycomb body. Next, holes are made in portions of the mask which close the incomplete cells by known means such as laser. Next, an end of the formed honeycomb body to which the mask has been attached is immersed into a plugging slurry containing the cordierite forming raw material, to fill the plugging slurry into the incomplete cells. Additionally, the cordierite forming raw material is prepared by blending components so as to obtain a theoretical composition of cordierite crystals. Specifically, a silica source component, a magnesia source component, an alumina source component and the like are blended.

Next, "the formed honeycomb body into which the plugging slurry has been filled" is fired to obtain the honeycomb structure. A firing temperature can suitably be determined in accordance with a material of the formed honeycomb body. When the material of the formed honeycomb body is, for example, cordierite, the firing temperature is preferably from 1380 to 1450° C., and further preferably from 1400 to 1440° C. Moreover, a firing time is preferably from about three to ten hours.

The formed honeycomb body may be dried before fired. There is not any special restriction on a drying method. Examples of the drying method include hot air drying, microwave drying, dielectric drying, reduced-pressure drying, vacuum drying, and freeze-drying. Among these methods, the dielectric drying, the microwave drying or the hot air drying is preferably performed alone, or a combination of the methods is preferably performed. Moreover, as drying conditions, a drying temperature of 30 to 150° C. and a drying time of one minute to two hours are preferable.

After firing the formed honeycomb body to obtain the fired honeycomb body, the plugging material slurry may be filled into the obtained fired honeycomb body. In this case, on conditions similar to the above firing temperature and firing time, it is possible to fire "the fired honeycomb body into which the plugging material slurry has been filled".

Additionally, in place of "preparing the formed honeycomb body and then filling the plugging material slurry into the incomplete cells" as described above, it is possible to use a die in which portions corresponding to the incomplete cells are beforehand closed. When such a die is used, the step of filling the plugging material slurry into the incomplete cells can be omitted.

[5] Honeycomb Structure (Third Honeycomb Structure):

Still another embodiment (the third honeycomb structure) of the honeycomb structure of the present invention is, for example, the following honeycomb structure. That is, the honeycomb structure of the present embodiment includes a honeycomb structure part having porous partition walls and an outer peripheral wall which is positioned at an outermost periphery. The partition walls form a plurality of cells having a hexagonal cross-sectional shape and extending through the honeycomb structure part from an inflow end surface as one end surface to an outflow end surface as the other end surface to become through channels of a fluid. A porosity of the partition walls is from 35 to 60%. An average pore diameter of the partition walls is from 1 to 5 µm. In the honeycomb structure, among the cells, there are plugged the cells which are formed between the outer peripheral surface of the honeycomb structure part and a position at which a distance from the outer peripheral surface corresponds to a length of 2% of a diameter of the honeycomb structure part.

In such a honeycomb structure, the porosity of the partition walls is from 35 to 60%, and the average pore diameter of the partition walls is from 1 to 5 µm. That is, a heat capacity of the partition walls of the honeycomb structure of the present embodiment is smaller than a heat capacity of a conventional honeycomb structure. Therefore, the honeycomb structure of the present embodiment is warmed at an early stage by an exhaust gas. Consequently, in a honeycomb catalyst body in which the honeycomb structure of the present embodiment is used as a catalyst support, a time until a catalyst becomes active shortens. Moreover, in the honeycomb structure of the present embodiment, "among the cells," there are plugged "the cells which are formed between the outer peripheral surface of the honeycomb structure part and the position at which the distance from the outer peripheral surface corresponds to the length of 2% of the diameter of the honeycomb structure part". Therefore, a heat capacity of an outer peripheral portion provided with the plugged cells is larger than that of a center portion other than the outer peripheral portion. As a result, once the honeycomb structure is heated up to a predetermined temperature, the temperature is retained. That is, in the honeycomb catalyst body in which the honeycomb structure of the present embodiment is used as the catalyst support, an active temperature of the catalyst is maintained. Therefore, in the above honeycomb catalyst body, a purification efficiency is enhanced. Furthermore, in the honeycomb structure of the present embodiment, a strength is enhanced.

In the honeycomb structure of the present embodiment, the partition walls have outer peripheral partition walls, and center partition walls which are the partition walls other than the outer peripheral partition walls. A thickness of each of the center partition walls may be from 0.064 to 0.114 mm, and a thickness of each of the outer peripheral partition walls may be from 0.02 to 0.07 mm larger than the thickness of each of the center partition walls. The outer peripheral partition walls are the partition walls to form the cells corresponding to ten cells from the outer peripheral wall toward the center. When the partition walls satisfy the above conditions, in the honeycomb catalyst body in which the honeycomb structure of the present embodiment is used as the catalyst support, the active temperature of the catalyst is further suitably maintained. Therefore, the purification efficiency is further enhanced. Furthermore, in the honeycomb structure of the present embodiment, the strength is further enhanced.

Similarly to the above-mentioned "honeycomb structure of the one embodiment", the porosity of the partition walls is from 35 to 60%, and further preferably from 40 to 55%. When the porosity of the partition walls is in the above range, temperature rise properties of the honeycomb structure enhance. Therefore, in the honeycomb catalyst body in which the honeycomb structure of the present embodiment is used, a purifying performance of the honeycomb catalyst body enhances. When the porosity of the partition walls is smaller than the lower limit value, a mass of the honeycomb structure increases. Therefore, light off properties are not sufficiently obtained, and the purifying performance might deteriorate. On the other hand, when the porosity is in excess of the upper limit value, the strength of the honeycomb structure deteriorates. Therefore, at canning or during use, the honeycomb structure might be damaged.

Similarly to the above-mentioned "honeycomb structure of the one embodiment", the average pore diameter of the partition walls is from 1 to 5 µm, and is further preferably from 1 to 3 µm. When the partition walls satisfy the above porosity and the average pore diameter of the partition walls is in the above range, the strength of the honeycomb structure enhances. Moreover, a value of a ratio of the strength of the partition walls to Young's modulus of the partition walls increases, and hence a resistance to heat shock of the honeycomb structure enhances. When the average pore diameter of the partition walls is smaller than the lower limit value, the catalyst is not easily loaded, and hence during the use, the catalyst might peel off. On the other hand, when the average pore diameter is in excess of the upper limit value, the strength of the honeycomb structure deteriorates, and hence at the canning or during the use, the honeycomb structure might be damaged.

Similarly to the above-mentioned "honeycomb structure of the one embodiment", the cells formed in the honeycomb structure part have the hexagonal cross-sectional shape. In other words, the cell shape of the honeycomb structure part is hexagonal in a cross section perpendicular to a cell extending direction. When the cross-sectional shape of the cells is the hexagonal shape in this way, the strength of the honeycomb structure deteriorates as compared with a case where the shape is another polygonal shape. Therefore, since the honeycomb structure has the above outer peripheral partition walls, the strength of the honeycomb structure can suitably be enhanced.

In the honeycomb structure of the present embodiment, as described above, among the cells, there are plugged the cells which are formed between the outer peripheral surface of the honeycomb structure part and the position at which the distance from the outer peripheral surface corresponds to the length of 2% of the diameter of the honeycomb structure part (hereinafter referred to as "the outer peripheral region" sometimes). This plugging is applied from the inflow end surface to the outflow end surface of the honeycomb structure part. When an outer shape of the honeycomb structure part is a polygonal cylindrical-like shape, "the diameter of the honeycomb structure part" is a length of the longest diagonal line. Here, in the cross section perpendicular to the cell extending direction of the honeycomb structure part, a figure which is concentric with the honeycomb structure part and has a diameter of 98% of the diameter of the honeycomb structure part is a boundary figure. "The position at which the distance from the outer peripheral surface corresponds to the length of 2% of the diameter of the honeycomb structure part" is a position at which an outer edge of the boundary figure is disposed. "The cells formed in "the outer peripheral region" indicate that the cells are entirely included in the above "outer peripheral region".

The thickness of each of the partition walls of the honeycomb structure part can be a thickness similar to the thickness of each of the partition walls of the honeycomb structure 100. Moreover, a cell density, an outer peripheral wall thickness and the like of the honeycomb structure part can be similar to those of the above-mentioned "honeycomb structure of the one embodiment".

[6] Manufacturing Method of Honeycomb Structure:

Next, a manufacturing method of the honeycomb structure of the present invention will be described. Hereinafter, the manufacturing method of the honeycomb structure which is the further embodiment of the honeycomb structure of the present invention will be described.

First, a formed honeycomb body is prepared by a method similar to the above-mentioned "manufacturing method of the honeycomb structure which is the other embodiment of the honeycomb structure of the present invention". That is, a kneaded material is extruded into a honeycomb shape to prepare the formed honeycomb body. The extrusion forming can be performed by using such a die that the hexagonal cell shape, the partition wall thickness and the cell density can be obtained. As a material of the die, a hard metal which does not easily wear down is preferable. The formed honeycomb body is a structure including partition walls which form a plurality of hexagonal cells extending through the formed honeycomb body from one end surface to the other end surface to become through channels of a fluid, and including an outer peripheral wall which is positioned at an outermost periphery.

Next, among the cells of the obtained formed honeycomb body, a plugging material slurry is filled into the cells formed between the outer peripheral surface of a formed honeycomb part and a position at which a distance from this outer peripheral surface corresponds to a length of 2% of a diameter of the formed honeycomb part. Thus, the above predetermined cells of the formed honeycomb body can be plugged from an inflow end surface to an outflow end surface.

As a method of plugging the predetermined cells, it is possible to employ a method similar to the above-mentioned "manufacturing method of the honeycomb structure which is the other embodiment of the honeycomb structure of the present invention".

Next, "the formed honeycomb body into which the plugging material slurry has been filled" is fired to obtain the honeycomb structure by a method similar to the above-mentioned "manufacturing method of the honeycomb structure which is the other embodiment of the honeycomb structure of the present invention".

Additionally, after firing the formed honeycomb body to obtain the fired honeycomb body, the plugging material slurry may be filled into the obtained fired honeycomb body. In this case, on conditions similar to the above firing temperature and firing time, it is possible to fire "the fired honeycomb body into which the plugging material slurry has been filled".

EXAMPLES

Hereinafter, the present invention will specifically be described with respect to examples. The present invention is not limited to these examples.

Example 1

As a cordierite forming raw material, alumina, aluminum hydroxide, kaolin, talc and silica were used. To this cordierite forming raw material, a pore former, a dispersion medium, an organic binder and a dispersant were added, respectively, and then mixed and kneaded to prepare a kneaded material. As the dispersion medium, water was used, and as the pore former, cokes were used. As the organic binder, hydroxypropyl methylcellulose was used, and as the dispersant, ethylene glycol was used.

Next, the kneaded material was extruded by using a predetermined die, to prepare a formed honeycomb body having partition walls which formed a plurality of cells extending through the formed honeycomb body from one end surface to the other end surface. In the formed honeycomb body, a cell shape in a cross section perpendicular to a cell extending direction was a hexagonal shape, and the whole shape was a circular cylindrical shape. Next, the prepared formed honeycomb body was dried by a microwave drier, and further completely dried by a hot air drier to obtain the dried formed honeycomb body (the dried honeycomb body). Afterward, both ends of the dried honeycomb body were cut and regulated to a predetermined dimension.

Next, a mask was attached to one end surface of the dried honeycomb body. At this time, all open frontal areas of the cells were closed with the mask. Next, the mask was irradiated with laser, thereby making holes in portions with which incomplete cells were closed.

Next, one end of this dried honeycomb body to which the mask was attached was immersed into a plugging material slurry, and the plugging material slurry was sucked through the other end of the dried honeycomb body. The plugging material slurry had the same composition as that of the above kneaded material. Additionally, a viscosity of the plugging material slurry was measured by a rotary viscometer. In this way, the plugging material slurry was filled into the incomplete cells of the dried honeycomb body. Afterward, the dried honeycomb body was fired at 1410 to 1440° C. for five hours to obtain a honeycomb structure.

The obtained honeycomb structure had a diameter of 100 mm, and a length of 90 mm along a central axis direction. A porosity of partition walls was 35%. An average pore diameter of the partition walls was 5 μm. A partition wall thickness was 0.089 mm. A thickness of an outer peripheral wall was 0.3 mm. A cell density was 93 cells/cm$^2$. A cell shape in a cross section perpendicular to the cell extending direction of a fired honeycomb body was a hexagonal shape. The porosity and average pore diameter of the partition walls were measured by a mercury porosimeter, respectively. The results are shown in Table 1.

Next, mixture particles of $\gamma Al_2O_3$ and $CeO_2$ were ground in a wet system by a ball mill, to obtain ground particles having pores. The obtained ground particles were immersed into a solution containing Pt and Rh to load Pt and Rh onto the inside surfaces of the pores of the ground particles. Afterward, acetic acid and water were added to the ground particles onto which Pt and Rh were loaded, to obtain a slurry for catalyst. Then, the prepared honeycomb structure was immersed into this slurry for catalyst. In this way, a catalyst layer was formed on the surfaces of the partition walls of the honeycomb structure. Afterward, the honeycomb structure was dried and further fired to obtain a honeycomb catalyst body.

Next, the obtained honeycomb catalyst body was subjected to evaluations by the following methods.

[Purification Efficiency]:

An $NO_x$—including gas for test was allowed to flow through the honeycomb catalyst body of the present example, and an amount of $NO_x$ in an exhaust gas discharged from this honeycomb catalyst body was analyzed by a gas analytic meter. Here, a temperature of the gas for test allowed to flow into a test piece was 200° C. Additionally, temperatures of the test piece and the gas for test could be regulated by a heater. As the heater, an infrared image furnace was used. As the gas for test, there was specifically used a gas obtained by mixing nitrogen with 5 vol % of carbon dioxide, 14 vol % of oxygen, 350 ppm of nitrogen monoxide (in terms of volume), 350 ppm of ammonia (in terms of volume) and 10 vol % of water. This gas for test was obtained by separately preparing water and a mixture gas of the other mixed gases, and mixing these components in a piping line when carrying out a test. As the gas analytic meter, "MEXA9100EGR manufactured by HORIBA Co." was used. Moreover, a space speed at the flowing of the gas for test into the test piece was 50000 ($time^{-1}$). In this way, a purification efficiency of the honeycomb structure was measured. When the evaluation result of "the purification efficiency" was suitable, it was seen that both "temperature rise properties" and "warmth retaining properties" were suitable.

[Pressure Loss]:

On room temperature conditions, air was allowed to flow through a test piece (the honeycomb catalyst body) at a flow speed of 0.5 $m^3$/minute, and differential pressures before and after the test piece were measured (a difference between an air inflow-side pressure and an air outflow-side pressure). In this way, a pressure loss of the honeycomb structure was measured.

[Isostatic Strength]:

The prepared honeycomb structure was disposed in a holder made of a metal and a rubber, and then the holder was disposed in a pressure container of a pressure device. Next, a pressure in the cell extending direction of the honeycomb structure was applied to the honeycomb structure by the pressure device, and a breakdown value at breakdown of the honeycomb structure was measured. In this way, an isostatic strength of the honeycomb structure was measured.

[Resistance to Erosion]:

First, a volume ($cm^3$) and a mass (g) of the prepared honeycomb structure were measured to calculate a bulk density ($g/cm^3$). Next, this honeycomb structure was canned (contained) in a can member, and the canned honeycomb structure was disposed in a test device. Next, the test device allowed SiC abrasive grains to collide with the end surfaces of the above honeycomb structure. Afterward, the honeycomb structure was removed, to measure the mass (g) of the honeycomb structure. Afterward, an amount of the honeycomb structure eroded by the above test (the erosion amount) was calculated from a difference between the mass of the honeycomb structure before the above test and the mass of the honeycomb structure after the test. Then, an erosion volume ($cm^3$) was calculated from the bulk density ($g/cm^3$) and the erosion amount (g). In this way, the erosion volume was measured.

Ratios of honeycomb structures of Examples 2 to 6 and Comparative Examples 1 to 4 were calculated by using the measured values of the honeycomb structure of the present example as references. Afterward, differences from the honeycomb structure of the present example ([measured values of the honeycomb structures of Examples 2 to 6 and Comparative Examples 1 to 4]–[the measured value of the honeycomb structure of the present example]) were calculated, respectively. The results are shown in Table 1. In Table 1 to Table 5, a column of a "pressure loss ratio" indicates a value calculated in accordance with the above equation on the basis of the value of the pressure loss measured by the above method. A column of an "isostatic strength ratio" indicates a value calculated in accordance with the above equation on the basis of the value of the isostatic strength measured by the above method. A column of a "ratio of the resistance to erosion" indicates a value calculated in accordance with the above equation on the basis of the value of the erosion volume measured by the above method.

TABLE 1

| | Length (mm) | Diameter (mm) | Porosity (%) | Average pore diameter (μm) | Partition wall thickness (mm) | Outer peripheral wall thickness (mm) | Cell density (cells/$cm^2$) | Purification efficiency ratio (%) | Pressure loss ratio (%) | Isostatic strength ratio (%) | Ratio of resistance to erosion (%) |
|---|---|---|---|---|---|---|---|---|---|---|---|
| Comparative Example 1 | 90 | 100 | 25 | 5 | 0.089 | 0.3 | 93 | −5 | 0 | 14 | 167 |
| Comparative Example 2 | 90 | 100 | 30 | 5 | 0.089 | 0.3 | 93 | −3 | 0 | 7 | 45 |
| Example 1 | 90 | 100 | 35 | 5 | 0.089 | 0.3 | 93 | 0 | 0 | 0 | 0 |
| Example 2 | 90 | 100 | 40 | 5 | 0.089 | 0.3 | 93 | 3 | 0 | −7 | −24 |
| Example 3 | 90 | 100 | 45 | 5 | 0.089 | 0.3 | 93 | 6 | 0 | −14 | −38 |
| Example 4 | 90 | 100 | 50 | 5 | 0.089 | 0.3 | 93 | 9 | 0 | −21 | −48 |
| Example 5 | 90 | 100 | 55 | 5 | 0.089 | 0.3 | 93 | 12 | 0 | −28 | −56 |
| Example 6 | 90 | 100 | 60 | 5 | 0.089 | 0.3 | 93 | 16 | 0 | −35 | −61 |
| Comparative Example 3 | 90 | 100 | 65 | 5 | 0.089 | 0.3 | 93 | 19 | 0 | −42 | −65 |
| Comparative Example 4 | 90 | 100 | 70 | 5 | 0.089 | 0.3 | 93 | 23 | 0 | −49 | −69 |

Examples 2 to 31 and Comparative Examples 1 to 19

Honeycomb structures were prepared similarly to Example 1, except that conditions shown in Table 1 to Table 5 were satisfied. The honeycomb structures were subjected to the above evaluations. The results are shown in Table 1 to Table 5. Additionally, in examples and comparative examples shown in Table 2, Example 11 was used as a reference in place of Example 1. In examples and comparative examples shown in Table 3, Example 14 was used as a reference in place of Example 1. In examples and comparative examples shown in Table 4, Example 17 was used as a reference in place of Example 1. In examples and comparative examples shown in Table 5, Comparative Example 16 was used as a reference.

TABLE 2

| | Length (mm) | Diameter (mm) | Porosity (%) | Average pore diameter (μm) | Partition wall thickness (mm) | Outer peripheral wall thickness (mm) | Cell density (cells/cm²) | Purification efficiency ratio (%) | Pressure loss ratio (%) | Isostatic strength ratio (%) | Ratio of resistance to erosion (%) |
|---|---|---|---|---|---|---|---|---|---|---|---|
| Example 7 | 90 | 100 | 35 | 1 | 0.089 | 0.3 | 93 | 0 | 0 | 25 | 188 |
| Example 8 | 90 | 100 | 35 | 2 | 0.089 | 0.3 | 93 | 0 | 0 | 19 | 96 |
| Example 9 | 90 | 100 | 35 | 3 | 0.089 | 0.3 | 93 | 0 | 0 | 12 | 48 |
| Example 10 | 90 | 100 | 35 | 4 | 0.089 | 0.3 | 93 | 0 | 0 | 6 | 19 |
| Example 11 | 90 | 100 | 35 | 5 | 0.089 | 0.3 | 93 | 0 | 0 | 0 | 0 |
| Comparative Example 5 | 90 | 100 | 35 | 6 | 0.089 | 0.3 | 93 | 0 | 0 | −6 | −14 |
| Comparative Example 6 | 90 | 100 | 35 | 7 | 0.089 | 0.3 | 93 | 0 | 0 | −12 | −25 |
| Comparative Example 7 | 90 | 100 | 35 | 8 | 0.089 | 0.3 | 93 | 0 | 0 | −19 | −33 |
| Comparative Example 8 | 90 | 100 | 35 | 9 | 0.089 | 0.3 | 93 | 0 | 0 | −25 | −39 |
| Comparative Example 9 | 90 | 100 | 35 | 10 | 0.089 | 0.3 | 93 | 0 | 0 | −31 | −45 |

TABLE 3

| | Length (mm) | Diameter (mm) | Porosity (%) | Average pore diameter (μm) | Partition wall thickness (mm) | Outer peripheral wall thickness (mm) | Cell density (cells/cm²) | Purification efficiency ratio (%) | Pressure loss ratio (%) | Isostatic strength ratio (%) | Ratio of resistance to erosion (%) |
|---|---|---|---|---|---|---|---|---|---|---|---|
| Comparative Example 10 | 90 | 100 | 35 | 5 | 0.051 | 0.3 | 93 | 21 | 16 | −27 | −79 |
| Example 12 | 90 | 100 | 35 | 5 | 0.064 | 0.3 | 93 | 13 | 11 | −18 | −60 |
| Example 13 | 90 | 100 | 35 | 5 | 0.076 | 0.3 | 93 | 6 | 5 | −9 | −17 |
| Example 14 | 90 | 100 | 35 | 5 | 0.089 | 0.3 | 93 | 0 | 0 | 0 | 0 |
| Example 15 | 90 | 100 | 35 | 5 | 0.102 | 0.3 | 93 | −6 | −6 | 9 | 11 |
| Example 16 | 90 | 100 | 35 | 5 | 0.114 | 0.3 | 93 | −10 | −13 | 18 | 25 |
| Comparative Example 11 | 90 | 100 | 35 | 5 | 0.127 | 0.3 | 93 | −15 | −20 | 27 | 43 |
| Comparative Example 12 | 90 | 100 | 35 | 5 | 0.140 | 0.3 | 93 | −19 | −28 | 36 | 54 |
| Comparative Example 13 | 90 | 100 | 35 | 5 | 0.152 | 0.3 | 93 | −23 | −36 | 45 | 67 |
| Comparative Example 14 | 90 | 100 | 35 | 5 | 0.165 | 0.3 | 93 | −26 | −45 | 55 | 82 |

TABLE 4

| | Length (mm) | Diameter (mm) | Porosity (%) | Average pore diameter (μm) | Partition wall thickness (mm) | Outer peripheral wall thickness (mm) | Outer peripheral portion thickness (mm) | Cell density (cells/cm²) | Purification efficiency ratio (%) | Pressure loss ratio (%) | Isostatic strength ratio (%) | Ratio of resistance to erosion (%) |
|---|---|---|---|---|---|---|---|---|---|---|---|---|
| Comparative Example 15 | 90 | 100 | 35 | 5 | 0.051 | 0.3 | 0.1 | 93 | −3 | 1 | −9 | 0 |
| Example 17 | 90 | 100 | 35 | 5 | 0.051 | 0.3 | 0.3 | 93 | 0 | 0 | 0 | 0 |
| Example 18 | 90 | 100 | 35 | 5 | 0.051 | 0.3 | 0.5 | 93 | 1 | −1 | 10 | 0 |
| Example 19 | 90 | 100 | 35 | 5 | 0.051 | 0.3 | 0.7 | 93 | 2 | −2 | 19 | 0 |
| Example 20 | 90 | 100 | 35 | 5 | 0.051 | 0.3 | 0.9 | 93 | 4 | −3 | 28 | 0 |
| Example 21 | 90 | 100 | 35 | 5 | 0.051 | 0.3 | 1.1 | 93 | 5 | −3 | 37 | 0 |
| Example 22 | 90 | 100 | 35 | 5 | 0.051 | 0.3 | 1.3 | 93 | 7 | −4 | 46 | 0 |
| Example 23 | 90 | 100 | 35 | 5 | 0.051 | 0.3 | 1.5 | 93 | 9 | −5 | 55 | 0 |
| Example 24 | 90 | 100 | 35 | 5 | 0.051 | 0.3 | 1.7 | 93 | 10 | −6 | 64 | 0 |
| Example 25 | 90 | 100 | 35 | 5 | 0.051 | 0.3 | 1.9 | 93 | 12 | −7 | 73 | 0 |

TABLE 5

| | Length (mm) | Diameter (mm) | Porosity (%) | Average pore diameter (μm) | Outer peripheral partition wall thickness (mm) | Center partition wall thickness (mm) | Difference of thickness between outer peripheral partition wall and center partition wall (mm) | Outer peripheral wall thickness (mm) | Cell density (cells/cm²) | Purification efficiency ratio (%) | Pressure loss ratio (%) | Isostatic strength ratio (%) | Ratio of resistance to erosion (%) |
|---|---|---|---|---|---|---|---|---|---|---|---|---|---|
| Comparative Example 16 | 90 | 100 | 35 | 5 | 0.089 | 0.089 | 0.00 | 0.3 | 93 | 0 | 0 | 0 | 0 |
| Comparative Example 17 | 90 | 100 | 35 | 5 | 0.099 | 0.089 | 0.01 | 0.3 | 93 | 0 | 0 | 13 | 0 |
| Example 26 | 90 | 100 | 35 | 5 | 0.109 | 0.089 | 0.02 | 0.3 | 93 | 0 | −1 | 25 | 0 |
| Example 27 | 90 | 100 | 35 | 5 | 0.119 | 0.089 | 0.03 | 0.3 | 93 | 1 | −1 | 38 | 0 |
| Example 28 | 90 | 100 | 35 | 5 | 0.129 | 0.089 | 0.04 | 0.3 | 93 | 1 | −2 | 50 | 0 |
| Example 29 | 90 | 100 | 35 | 5 | 0.139 | 0.089 | 0.05 | 0.3 | 93 | 1 | −2 | 63 | 0 |
| Example 30 | 90 | 100 | 35 | 5 | 0.149 | 0.089 | 0.06 | 0.3 | 93 | 1 | −2 | 75 | 0 |
| Example 31 | 90 | 100 | 35 | 5 | 0.159 | 0.089 | 0.07 | 0.3 | 93 | 1 | −3 | 88 | 0 |
| Comparative Example 18 | 90 | 100 | 35 | 5 | 0.169 | 0.089 | 0.08 | 0.3 | 93 | 2 | −3 | 100 | 0 |
| Comparative Example 19 | 90 | 100 | 35 | 5 | 0.179 | 0.089 | 0.09 | 0.3 | 93 | 2 | −4 | 113 | 0 |

Additionally, in Table 4, the "outer peripheral portion thickness" is a distance from the outer peripheral surface to a boundary between a region where the cells are plugged and a region where the cells are not plugged. In other words, the thickness is the maximum width (the maximum thickness) of the region where the cells are plugged.

As seen from Table 1 to Table 5, it can be confirmed that each of the honeycomb structures of Examples 1 to 31 can be used as a catalyst support of a catalyst body (the honeycomb catalyst body) in which a time until a catalyst becomes active is short and a purification efficiency is enhanced, as compared with the honeycomb structures of Comparative Examples 1 to 19.

A honeycomb structure of the present invention can suitably be used in purifying an exhaust gas.

DESCRIPTION OF REFERENCE MARKS

1: partition wall, 2 and 2a: cell, 4: honeycomb structure part, 5: outer peripheral wall, 8: plugged portion, 11: inflow end surface, 12: outflow end surface, 21: incomplete cell, and 100, 200 and 300: honeycomb structure.

What is claimed is:

1. A honeycomb structure comprising:
   a honeycomb structure part having porous partition walls which form a plurality of cells having a hexagonal cross-sectional shape and extending through the honeycomb structure part from an inflow end surface as one end surface to an outflow end surface as the other end surface to become through channels of a fluid, and having an outer peripheral wall which is positioned at an outermost periphery,
   wherein a porosity of the partition walls is from 35 to 60%,
   an average pore diameter of the partition walls is from 1 to 5 μm,
   the partition walls have outer peripheral partition walls which are the partition walls to form the cells corresponding to ten cells from the outer peripheral wall toward the center, and center partition walls which are the partition walls other than the outer peripheral partition walls,
   a thickness of each of the center partition walls is from 0.064 to 0.114 mm, and
   a thickness of each of the outer peripheral partition walls is from 0.02 to 0.07 mm larger than the thickness of each of the center partition walls,
   wherein among the cells, there are incomplete cells which are the cells formed by the partition walls and the outer peripheral wall, and all of the incomplete cells are plugged from the inflow end surface to the outflow end surface, and
   wherein cells other than the incomplete cells in the plurality of cells are open from the inflow end surface to the outflow end surface of the honeycomb structure.

2. The honeycomb structure according to claim 1, wherein the incomplete cells and the cells having three or more sides which come in contact with the incomplete cells are plugged from the inflow end surface to the outflow end surface of the honeycomb structure part.

3. The honeycomb structure according to claim 2, wherein the incomplete cells and the cells adjacent to the incomplete cells are plugged from the inflow end surface to the outflow end surface of the honeycomb structure part.

4. The honeycomb structure according to claim 1, wherein the honeycomb structure has a cell density of 93-116 cells/cm².

5. The honeycomb structure according to claim 1, wherein the average pore diameter of the partition walls is 1-4 μm.

6. The honeycomb structure according to claim 1, wherein the thickness of each of the outer peripheral partition walls is from 0.03 to 0.06 larger than the thickness of each of the center partition walls.

7. The honeycomb structure according to claim 1, wherein all of the cells other than the incomplete cells are open from the inflow end surface to the outflow end surface of the honeycomb structure.

8. A honeycomb catalyst body comprising: a honeycomb structure according to claim 1, and a catalyst layer on surfaces of the partition walls of the honeycomb structure.

9. A honeycomb structure comprising:
   a honeycomb structure part having porous partition walls which form a plurality of cells having a hexagonal cross-sectional shape and extending through the honeycomb structure part from an inflow end surface as one end surface to an outflow end surface as the other end surface to become through channels of a fluid, and having an outer peripheral wall which is positioned at an outermost periphery, wherein a porosity of the partition walls is from 35 to 60%, an average pore diameter of the partition walls is from 1 to 5 µm, the partition walls have outer peripheral partition walls which are the partition walls to form the cells corresponding to ten cells from the outer peripheral wall toward the center, and center partition walls which are the partition walls other than the outer peripheral partition walls, a thickness of each of the center partition walls is from 0.064 to 0.114 mm, a thickness of each of the outer peripheral partition walls is from 0.02 to 0.07 mm larger than the thickness of each of the center partition walls, among the cells, there are plugged cells which are formed between the outer peripheral surface of the honeycomb structure part and a position at which a distance from the outer peripheral surface corresponds to a length of 2% of a diameter of the honeycomb structure part, and wherein cells other than the plugged cells in the plurality of cells are open from the inflow end surface to the outflow end surface of the honeycomb structure.

10. The honeycomb structure according to claim 9, wherein the honeycomb structure has a cell density of 93-116 cells/cm$^2$.

11. The honeycomb structure according to claim 9, wherein the average pore diameter of the partition walls is 1-4 µm.

12. The honeycomb structure according to claim 9, wherein the thickness of each of the outer peripheral partition walls is from 0.03 to 0.06 larger than the thickness of each of the center partition walls.

13. The honeycomb structure according to claim 9, wherein all of the cells other than the plugged cells are open from the inflow end surface to the outflow end surface of the honeycomb structure.

14. A honeycomb catalyst body comprising: a honeycomb structure according to claim 9, and a catalyst layer on surfaces of the partition walls of the honeycomb structure.

* * * * *